(12) United States Patent
Fabrikant et al.

(10) Patent No.: US 8,909,646 B1
(45) Date of Patent: Dec. 9, 2014

(54) PRE-PROCESSING OF SOCIAL NETWORK STRUCTURES FOR FAST DISCOVERY OF COHESIVE GROUPS

(71) Applicants: Alexander Fabrikant, East Palo Alto, CA (US); Atish Das Sarma, Mountain View, CA (US)

(72) Inventors: Alexander Fabrikant, East Palo Alto, CA (US); Atish Das Sarma, Mountain View, CA (US)

(73) Assignee: Google Inc., Mountain View, CA (US)

( * ) Notice: Subject to any disclaimer, the term of this patent is extended or adjusted under 35 U.S.C. 154(b) by 195 days.

(21) Appl. No.: 13/731,505

(22) Filed: Dec. 31, 2012

(51) Int. Cl.
G06F 17/30 (2006.01)
(52) U.S. Cl.
CPC ............................... *G06F 17/30598* (2013.01)
USPC ............ 707/737; 707/749; 707/758; 707/776
(58) Field of Classification Search
None
See application file for complete search history.

(56) References Cited

U.S. PATENT DOCUMENTS

| | | | |
|---|---|---|---|
| 8,572,129 B1* | 10/2013 | Lee et al. ...................... | 707/798 |
| 2005/0171955 A1* | 8/2005 | Hull et al. ...................... | 707/10 |
| 2005/0278443 A1 | 12/2005 | Winner et al. | |
| 2007/0121843 A1 | 5/2007 | Atazky et al. | |
| 2010/0145777 A1 | 6/2010 | Ghosh et al. | |
| 2011/0320250 A1 | 12/2011 | Gemmell et al. | |
| 2012/0278310 A1* | 11/2012 | Laksmono et al. ............ | 707/722 |
| 2013/0013667 A1* | 1/2013 | Serena .......................... | 709/203 |

* cited by examiner

*Primary Examiner* — Anh Tai Tran
(74) *Attorney, Agent, or Firm* — Foley and Lardner LLP; John D. Lanza

(57) ABSTRACT

Aspects and implementations of the present disclosure are directed to methods and systems of pre-processing a social network structure for fast discovery of cohesive groups. In general, in some implementations, a data processing system identifies a cohesive user group in a social network for delivery of a tailored content item. Generally, the data processing system identifies an affinity criteria; generates a set of user identifiers having characteristics that satisfy the affinity criteria; and generates graphs of users with at least one direct or indirect social network user connection with other user identifiers in the graph. The data processing system returns or stores the graph on computer readable media for later use. A graph may be generated with edges representing connections between user identifiers; edges may be weighted for the number and lengths of connection paths for indirect connections, and for similarities between users.

20 Claims, 7 Drawing Sheets

Example online query:
"Count groups of 3+ people who are below 40 years old and interested in photography, and are each others' friends or friends-of-friends"

PRE-PROCESSING OF SOCIAL NETWORK STRUCTURES FOR FAST DISCOVERY OF COHESIVE GROUPS

BACKGROUND

A problem arises in determining cohesive groups from within large social networks. Implementations herein are directed to this problem.

SUMMARY

Aspects and implementations of the present disclosure are directed to methods and systems of pre-processing a social network structure for fast discovery of cohesive groups. In general, in some implementations, a data processing system identifies a cohesive user group in a social network for delivery of a tailored content item. Generally, the data processing system identifies an affinity criteria; generates a set of user identifiers having characteristics that satisfy the affinity criteria; and generates graphs of users with at least one direct or indirect social network user connection with other user identifiers in the graph. The data processing system returns or stores the graph on computer readable media for later use. A graph may be generated with edges representing connections between user identifiers; where edges may be weighted for the number and lengths of connection paths for indirect connections, and for similarities between users.

At least one aspect is directed to a computer implemented method of identifying a cohesive user group in a social network for delivery of a tailored content item. The method includes identifying first affinity criteria comprising at least one of a first interest category and a first personal attribute classification and accessing one or more databases of information for a social network, the information comprising a plurality of user identifiers, each user identifier associated with data for personal attribute and interest characteristics and social network user connections. The method includes generating, using one or more computer processors, a first set of user identifiers, by processing data obtained from the one or more databases such that first set is limited to user identifiers associated with characteristics that satisfy the first affinity criteria and a graph representative of social network user connections. The graph comprises a plurality of nodes and a plurality of edges, wherein each node represents a user identifier from the first set of user identifiers and each edge connects a pair of nodes. Each edge is one of a direct-connection edge representing a direct social network user connection between each user identifier represented by the respective pair of nodes connected by the edge and an indirect-connection edge representing an indirect social network user connection between each user identifier represented by the respective pair of nodes connected by the edge. The method includes generating a sub-graph of the graph, wherein each edge of the sub-graph satisfies selected edge criteria. In some implementations, the method includes storing the edges of the sub-graph on computer readable media. In some implementations, the sub-graph is a connected graph.

In some implementations, the method includes assigning a weight to each edge in the graph, wherein the edge criteria comprises at least a weight threshold. In some implementations, the weight for each respective edge is a function of one or more of: a similarity of one or more interest characteristics for each user identifier of the pair of user identifiers represented by the nodes connected by the respective edge, a similarity of one or more personal attribute characteristics for each user identifier of the pair of user identifiers represented by the nodes connected by the respective edge, a number of social network users identifiers having a direct connection to each user identifier of the pair of user identifiers represented by the nodes connected by the respective edge, a number of hops in the social network separating each user identifier of the pair of user identifiers represented by the nodes connected by the respective edge, and a metric for messages communicated between each user identified by the pair of user identifiers represented by the nodes connected by the respective edge. In some implementations, the message metric is one of a count of messages communicated between each user identified by the pair of user identifiers over a fixed period of time, an average frequency of messages communicated between each user identified by the pair of user identifiers, and a ratio of messages communicated between each user identified by the pair of user identifiers compared with a total number of messages communicated by the respective users over a period of time. In some implementations, the selected edge criteria includes at least a maximum number of hops separating the pair of user identifiers represented by the nodes connected by each respective edge.

At least one aspect is directed to a system for identifying a cohesive user group in a social network for delivery of a tailored content item. The system includes one or more computer processors configured to access to one or more databases storing information for a social network, the information comprising a plurality of user identifiers, each user identifier associated with data for personal attribute and interest characteristics and social network user connections. The one or more computer processors are configured to identify first affinity criteria comprising at least one of a first interest category and a first personal attribute classification; generate a first set of user identifiers, by processing data obtained from the one or more databases such that first set is limited to user identifiers associated with characteristics satisfying the first affinity criteria; and generate a graph representative of social network user connections comprising a plurality of nodes and a plurality of edges. The graph comprises a plurality of nodes and a plurality of edges, wherein each node represents a user identifier from the first set of user identifiers and each edge connects a pair of nodes. Each edge is one of a direct-connection edge representing a direct social network user connection between each user identifier represented by the respective pair of nodes connected by the edge and an indirect-connection edge representing an indirect social network user connection between each user identifier represented by the respective pair of nodes connected by the edge. The processors are further configured to generate a sub-graph of the graph, wherein each edge of the sub-graph satisfies selected edge criteria. The processors may display the resulting sub-graph, return the resulting sub-graph, or store the resulting sub-graph on computer readable media. In some implementations, the sub-graph is a connected graph.

In some implementations, an interest category comprises a plurality of interest characteristics and a personal attribute classification comprises a plurality of personal attribute characteristics. In some implementations, a personal attribute classification comprises one or more of a gender, an age range, an education level, a relationship status, a professional status, and a geographic location. In some implementations, a social network user connection is one of a friend connection, professional network connection, and match making connection.

BRIEF DESCRIPTION OF THE DRAWINGS

The above and related objects, features and advantages of the present disclosure will be more fully understood by reference to the following detailed description, when taken in conjunction with the following figures, wherein.

DETAILED DESCRIPTION

Figure 1:
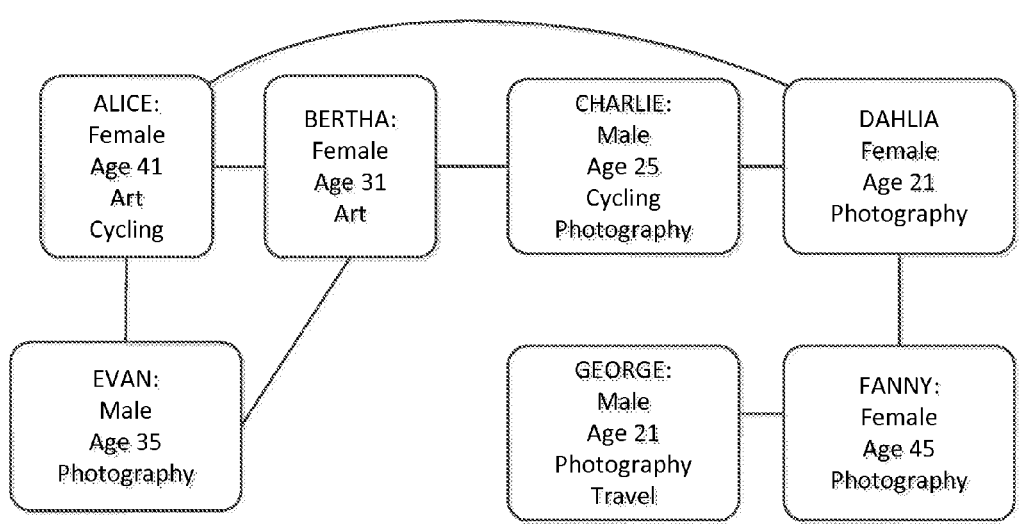
FIG. 1 is a diagram of a social network G of user identifiers.

Implementations described generally relate to a system, method, and computer program product for determining cohesive groups within social networks using pre-processing. Note that for situations in which the systems discussed here collect personal information about users, or may make use of personal information, the users may be provided with an opportunity to control whether programs or features may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

For many such activities, potentially thousands of people participating in a social network, e.g., Google+, may be interested in receiving advertisements and/or coupons. However, for advertisements and coupons directed at groups, it may be difficult for a computer system to find such a socially cohesive group of K people who would want to do the activity together, such that it would be worthwhile to make an advertisement offer or coupon offer to the group as a whole. This problem can arise for a number of reasons. For example, the activity may involve an obscure interest, such as go-karting, that may not be "socially local." A user may like go-karting, but the user's go-karting interest does not necessarily influence the user's friends, even if there are thousands of go-karting fans in the user's city. Further, the links corresponding to shared interest in this activity may not be represented on the online social network offering this advertising platform. For example, a user may like ballroom dancing, but does not actually add ballroom dancing partners on a social network. Furthermore, the offer may involve a commitment which most people would not want to make. For example, a user may have the weekend free to go to Las Vegas, but it may be difficult to find four other people who all know each other, AND are free for the weekend, AND would want to go to Las Vegas. The relationship "friend" is used herein as it would be in a social network. However, the term "friend" should be read to mean any associative relationship between two participants regardless of the actual designation of the relationship. For example, users connected by "worked with" relationships, "knows" relationships, "connection" relationships, "related to" relationships, "friend" relationships, "fan" relationships, or any other such designation, may qualify as "friends" for the present purposes.

In general, for system applications, it may be difficult to identify a group of K people who are interested in a given activity, and are all available at the same time, and would want to do this activity together.

Implementations described herein use a two-stage offline process, in advance of an advertisement or coupon campaign, to determine socially cohesive groups within an online social network so that even more specialized socially cohesive groups can be determined quickly. The term "offline" is used to indicate that a computer system or server, which may remain connected to a network, performs processing without requiring a social network user (or user device) to be connected, online, or otherwise actively present in the network. Generally, "offline," distinguishes preprocessing opportunities as compared to processing responsive to a request or contemporaneously with a session. In some implementations, a step may be performed of determining offline a respective collection of user identifiers for each of a plurality of the broad categories and/or user personal attributes. A step may then be performed offline of selecting, for each of the collections of user identifiers, one or more first groups of user identifiers that are socially cohesive. The offline selecting may be performed by accessing at least the friend attributes data in the one or more databases, as a signal of affinity between users to participate in the activity together, thereby improving the probability of finding matches.

For example, some well connected groups of size K, in a "friends-of-friends" graph, may be found and, for example, offered a coupon. Groups of people with many friends-of-friends links may therefore form a very practical tradeoff for group offers, between groups of friends on one hand, and groups of strangers on the other hand. In a social network, a user identifier's friends-of-friends network may be much larger than the immediate-friends network. As such, implementations disclosed herein may significantly expand the search space for identifying a suitable group of K friends, especially for relatively obscure activities or activities for which a system may have difficulty identifying likely participants. In addition, friends-of-friends, especially those with many friends in common, tend to have fairly similar interests and back-grounds. Thus, even though not all members in the group may know each other, they may share several common friends, and may be more likely to enjoy an outing together in such a group.

FIG. 1 illustrates an example social network as an example graph "G" representative of friend relations, where the nodes in the figure represent user identifiers. User-user relationships within the social network are represented in the figure as edges between the nodes. A graph is said to be a "connected graph" if there is a path along the edges from any one node connecting to every other node. A path along a single edge is a single-hop path, a path traversing two edges and one intermediary node is a two-hop path, and a path traversing n edges is an n-hop path. The edges may have weights to reflect strengths of the corresponding relationships. A weight may be determined by one or more factors such as, for example, how many friends the pair of user identifiers have in common, how many personal attributes (gender, age range, location, income level, etc.) the pair of user identifiers have in common, how many messages are exchanged between the pair of user identifiers over a period of time. Each user identifier node in G may be labeled with various types of such interests (e.g., interest categories) which advertisers may use to tailor content items. In some implementations, these interests may be entered explicitly by the user as part of its public social network profile, or may be machine-learned from a machine search of the corpus of the user identifier's previous interactions with the social network service based on criteria, key words, etc., such as a search of social update content, photo tags, or content searches (such as in Google+ Sparks or Google web search), to name a few.

In an example, a first offline operation may involve a step of identifying offline, by accessing interest attributes data and personal attributes data in one or more databases for the social network, a respective first collection of user identifiers for each of a plurality of broad categories and for each of one or more personal attributes, e.g., gender, age range, location. Examples of broad interest groups may be extreme sports, art, photography, cycling, running, fine cuisine, finance, real estate, just to name a few. For example, there may be as few as one or two, or as many as 400 or more, broad interest categories. Note that these collections of user identifiers based on interest or user attributes, do not require friend connections between the user identifiers to be in the collection.

Figure 2A:
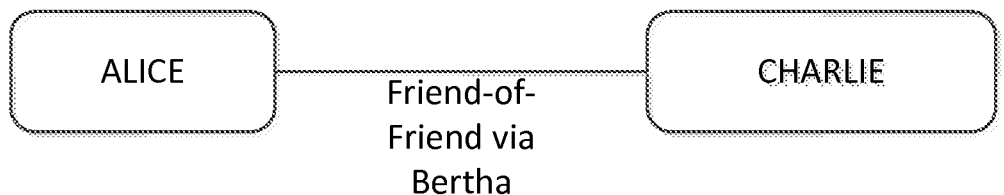
FIGS. 2A, 2B, and 2C are diagrams of groups of user identifiers determined from various collections of user identifiers based on interests.
Figure 2B:
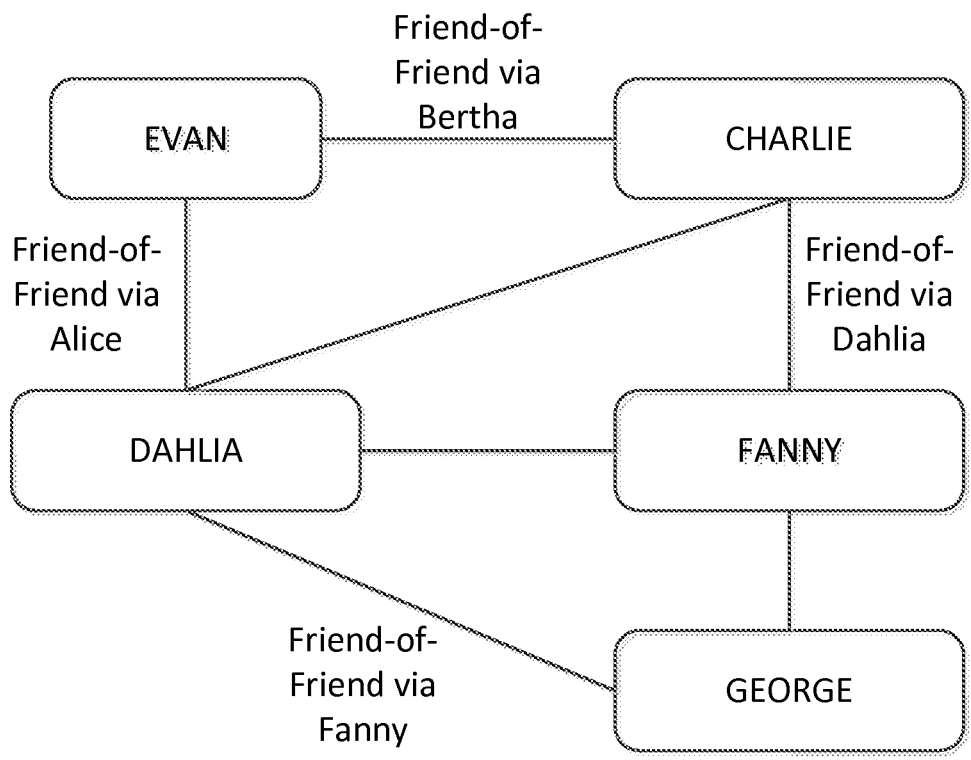
Figure 2C:
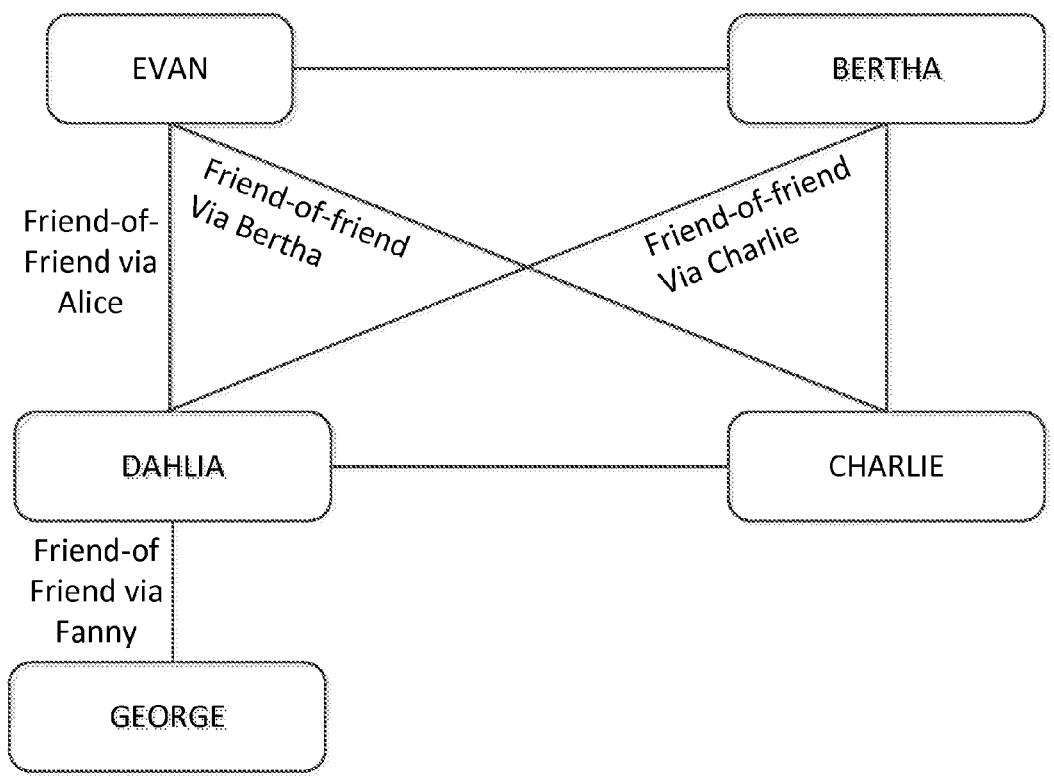

For each of the collections directed to the broad interest categories and the collections based on user personal attributes, a second offline operation may comprise a step of determining cohesive social groups within the respective collections. For example, a square of the graph G, i.e., $G^2$, may be calculated. The square of the graph ($G^2$) has an edge (pseudo-relationship) between any two user identifiers that are friends or who have at least one friend in common. In some implementations, at least one processing circuit may be employed to take the social network graph G as an input and the collection data, and filter based on the respective collection interest or the respective personal attribute, to determine a set of one or more sub-graphs of $G^2$. FIG. 2A illustrates a first sub-graph of $G^2$ from within the social network of FIG. 1 determined for the cycling collection. FIG. 2B illustrates a second sub-graph of $G^2$ from within the social network of FIG. 1 determined from the photography collection. FIG. 2C illustrates a third sub-graph of $G^2$ from within the social network of FIG. 1 determined for user identifiers under 40 years of age.

In some implementations, a strength of any edge in $G^2$, for example between users u and v, may be determined by weights on the edge between u and v, as well as the number of (and weights of) edges (u, w) and (w, v), where w is a common neighbor/friend of both u and v. In some implementations, the graph $G^2$ may have an edge between two nodes if and only if the two nodes are friends, and/or at least have one common friend in G, with higher weights provided if they have many common friends in G. In some other implementations, more levels of common neighbor/friend may be involved, such as (u, w), (w, x), (x, v).

Thus, in some implementations a two-stage offline processing pipeline may be applied to the graph G for the social network. Then a fast online system for advertising inventory analytics may be implemented using the results of this offline pre-processing to enable advertisers to rapidly iterate on possible group-coupon campaigns. In some implementations, tradeoffs may be found between (1) narrow interest targeting of group coupons, and (2) the number of possible target groups of sufficient size and connectivity that match the interest query.

Figure 3:
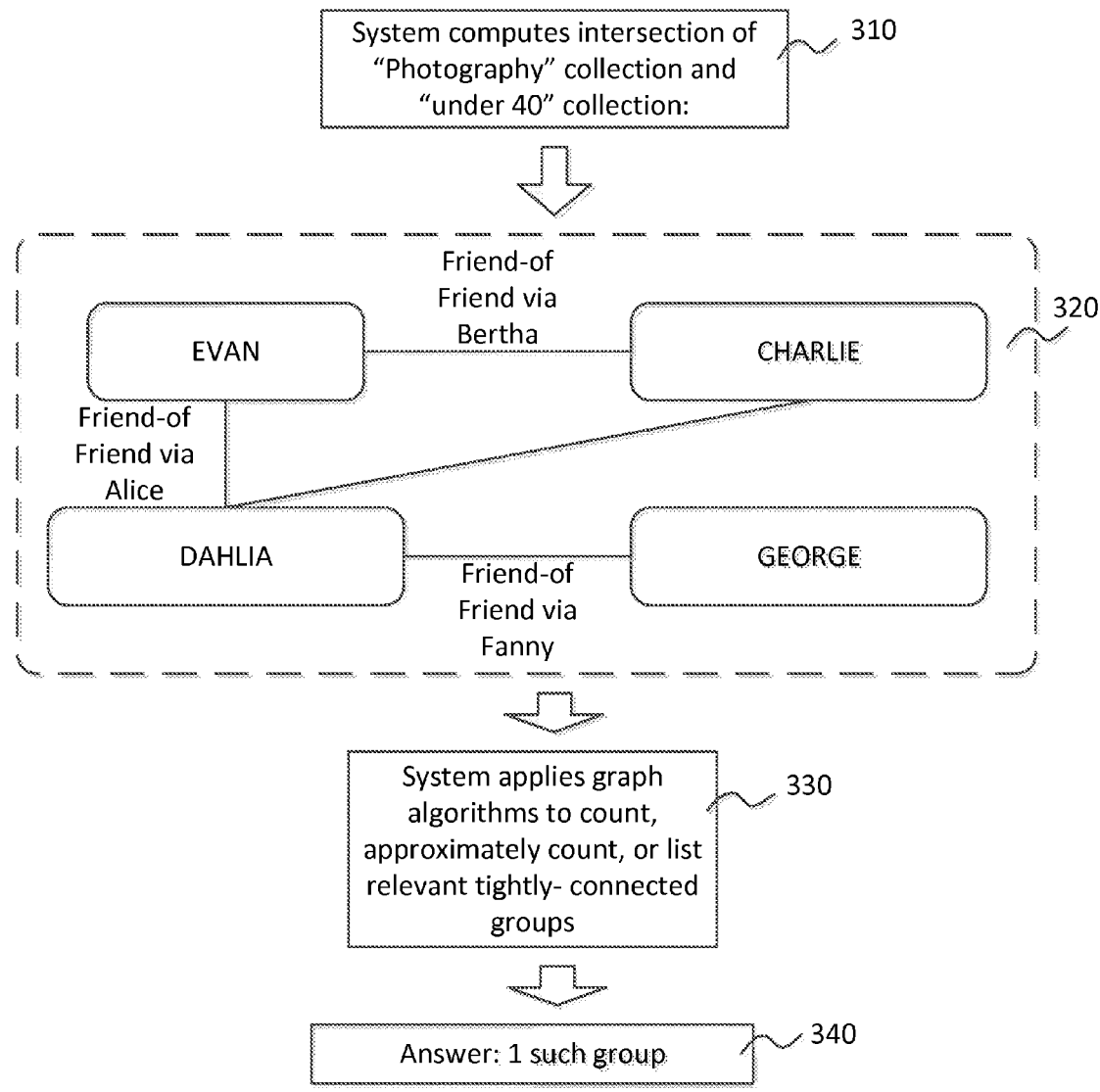
FIG. 3 is a diagram of results of an intersection of specifications for an advertising campaign, e.g., cohesive groups of at least 3 user identifiers, who are below 40 years old, with an interest in photography.

FIG. 3 illustrates computerized processing of an illustrative query seeking a number of cohesive groups in a larger social network, including at least three members, that satisfy targeting criteria for an advertising campaign, i.e., individuals who are below 40 years old with an interest in photography. At step 310, the system computes an intersection of users from a "Photography" collection of users (e.g., as shown in FIG. 2B) and an "Age below 40" collection of users (e.g., as shown in FIG. 2C), each a sub-graph of $G^2$. The resulting intersection sub-graph (320) is analyzed to identify any such groups. At step 330, the system may apply graph algorithms to count, approximate a count, or list relevant tightly-connected groups. At step 340, a result, e.g., the count, approximate count, or list identified in step 330, is returned.

A third operation may comprise filtering/pruning the expanded network into multiple graphs. This operation may be performed offline before determining the first groups of user identifiers by intersecting one or more of the collections based on the activity related to the coupon or advertisement, or based on a request of the advertiser. Alternatively, this operation may be performed offline or online after receiving the advertising campaign by intersecting first groups derived from different ones of the collections. For example, $G^2$ may result in a graph with many times more edges/relationships between user identifiers than G. For many advertising campaigns (such as the Las Vegas vacation coupon, a restaurant discount offer, a go-karting voucher, etc.), it may be important that the set of user identifiers have more in common than just mutual friends. For many activities, it may also be important that the group of user identifiers live near each other. For many activities, prospective customers may prefer to be of similar ages. According to some implementations, $G^2$ may be pruned down to form a sub-graph only containing edges that are meaningful in the context of the advertisement with these constraints. When pruning/filtering is performed offline, it may, in some implementations, be performed as part of the previously described determination of cohesive social groups. In some implementations, this avoids the need to record a full list of possible "pseudo-relationships," and allows for recording only a filtered-down list of "pseudo-relationships." In some contexts, this can result in a boost to performance.

In some implementations, a plurality of offline pruned/filtered sub-graphs of $G^2$ may be provided to enable faster query-time access to the graph in conjunction with various restrictions. In a first example, a filter by age proximity may be implemented. Specifically, only edges between user identifiers whose ages differ by no more than a fixed factor are included. For example, a multiplicative factor of 1.25 may be employed, under the assumption that a 20-year-old is unlikely to seek out the company of people outside the age range of 16-25, while a 40-year-old may be limited to 32-50. In a second example, a filter by gender may be implemented. For example, only edges between females may be retained, such as in a case where an advertiser advertises group spa vouchers or Las Vegas trips for females, or only edges between males may be retained, such as in a case of go-karting coupons, or pub crawls. In a third example, a filter by geography may be implemented. For example, only edges of $G^2$ that connect friends or friends-of-friends that live within 100 miles of each other may be retained. In a fourth example, one or two other similarly coarse demographic restrictions may be employed.

In some implementations, some online processing may be implemented. For example, a storage system implemented in the one or more databases may enable a number of flexible online queries. An advertiser may enter the system and propose to the system to setup a coupon campaign for interest X, targeted to groups of at least Y people, with a set Z of fixed restrictions. The online system may query the $G^2$ graph with restrictions Z, using an algorithm for finding and counting well-connected groups in a graph. In some implementations, algorithms may include, for example, those developed for the "densest sub-graph problem," in which a set S of at least k user identifiers may be found, such that the total number or sum of weights of edge connections between user identifiers of S is maximized. For example, Khuller and Saha describe an algorithm in which nodes with the fewest connecting edges are removed and a density of the remaining sub-graph is calculated, iteratively approaching a graph with maximum density. "*On Finding Dense Subgraphs*," Khuller and Saha, University of Maryland, College Park, 36th ICALP, 2009. The Khuller article is hereby incorporated by reference. In some implementations, algorithms such as those developed for the "k-core problem" may also employed, in which the largest set of nodes S may be found such that any node s in S has at least k neighbors in S. For example, Batagelj and Zaveršnik describe an algorithm employing an efficient data structure in which the nodes are sorted by the number of respective neighbors and whereby nodes with an insufficient number of neighbors are removed in a depth-first approach. "*An O(m) Algorithm for Cores Decomposition of Networks*," Batagelj and Zaveršnik, University of Ljubljana, 2003. The Batagelj article is hereby incorporated by reference. In the context of some of the described implementations, k may be chosen as the largest value such that the resulting size of the k-core S is at least K.

In some implementations, the system may return to the advertiser the number of distinct groupings of social network members that match the advertiser's query parameter for interest, group size, and fixed restrictions. The system may also return aggregate demographic details of matching groups to further enable the advertiser to fine-tune the campaign. For example, it may return information that for the coupon for a salon treatment, there are 30 groups of five females in the city of Des Moines. In some implementations, the system may return an estimate of the number of such groupings using an approximation algorithm.

In some other implementations, instead of the advertisers preselecting certain restrictions, the system may be programmed to automatically learn that group ad campaigns for a particular query interest X are most efficient when a specific set of fixed restrictions Z is used. The system in such implementations may suggest or require the advertiser to use the Z fixed restrictions. For example, if an advertiser designs an ad campaign for an "online poker" interest, the system may propose or require the advertiser to restrict to groups of similar age, but without a locality restriction.

According to some of the described implementations, advantageously, those user identifiers that are less connected and/or have a low-level of online activities may now be targeted, as these user identifiers' friends may be better connected and may spend more online time. As such, conversions and impressions may be maximized. In some implementations, various algorithms may be employed to optimize the results, and the performance metrics may be used that are indicative of a strength or effectiveness of a social community. In some implementations, model learning and training may be employed in the process.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by an advertisement server or other content source.

In some implementations, advertisers may utilize existing social networks to not only identify user identifiers with specific interests, but also to tap a neighborhood graph of the social networks to find potential friends. In some implementations, offer-tailored groups of k-users may be suggested to potential advertisers. Specific advertisements and/or coupons may be marketed to groups of people rather than individually. This may improve the likelihood of purchase of group-offers and increase profits, as the groups may be cohesive groups of friends. In some implementations, a group coupon may be used that only may be validated if at least a predetermined number of the user identifiers in the group accept an offer associated with the group coupon.

Implementations described herein provide an automated platform promoting group coupons and advertisements for group activities. In an example, an offer may read "we are offering you and your friends Bob and Sue a 50%-off spa treatment if you all go together. Bob and Sue have already accepted—if you join them, you all get to go!" Implementations of these types of offers may significantly change the offer-based advertising industry.

Figure 5:
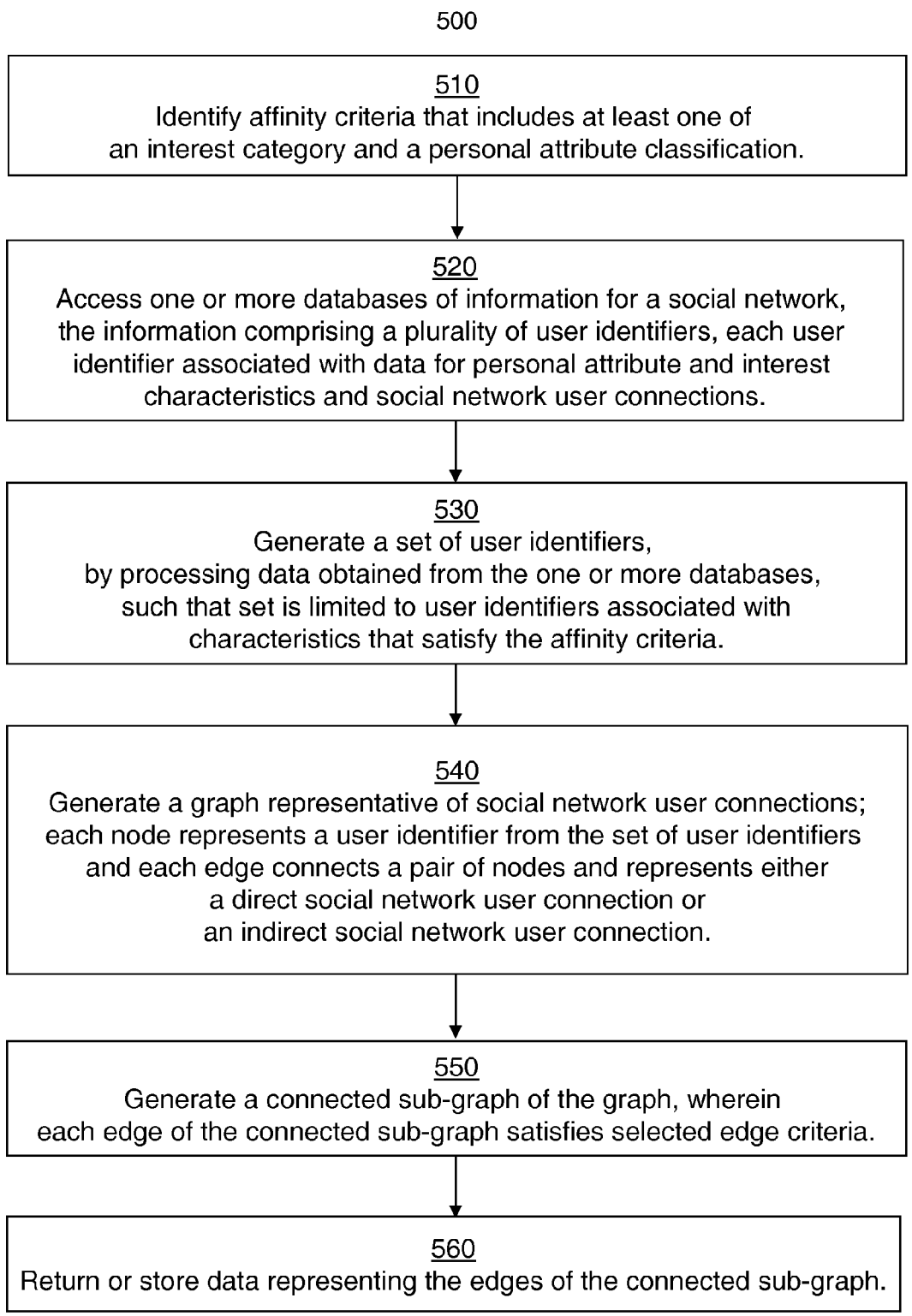
FIG. 5 is a flowchart for an implementation.

FIG. 5 is a flow chart for a method 500 of identifying a cohesive user group in a social network for delivery of a tailored content item. In some implementations, the method 500 is performed by a computer processing system, e.g., the system 610 illustrated in FIG. 6 and described below. At step 510, the system identifies an affinity criteria that includes at least one of an interest category and a personal attribute classification. At step 520, the system accesses one or more databases of information for a social network, the information including a plurality of user identifiers, each user identifier associated with data for personal attribute and interest characteristics and social network user connections. At step 530, the system generates a set of user identifiers by processing data obtained from the one or more databases such that the set of user identifiers is limited to user identifiers associated with characteristics that satisfy the affinity criteria. At step 540, the system generates a graph representative of social network connections comprising a plurality of nodes and a plurality of edges. At step 550, the system generates a sub-graph of the graph. At step 560, the system stores data representing the nodes and edges of the resulting sub-graph.

At step 510, the system identifies affinity criteria that includes at least one of an interest category and a personal attribute classification. In some implementations, an offline operation preprocesses data prior to requests for an advertising campaign. The offline operation may be repeated after some requests, in preparation for future requests for an advertising campaign. The offline processing can reduce the computations necessary on the massive amount of data available for the social network to a manageable level. An interest category identified as, or as a portion of, the affinity criteria may include a plurality of interests. Examples of the potential interest categories include extreme sports, art, photography, racing, running, fine cuisine, finance, and real estate. A personal attribute classification identified as, or as a portion of, the affinity criteria may include a plurality of personal attributes. Examples of personal attribute classifications include gender, age range, education level, relationship status (e.g., single, dating, married, divorced, widow, etc.), professional status (e.g., unemployed, employed full-time or part-time, looking for a new job, retired, etc.), and geographic location. In some implementations, multiple sets of criteria are used. For example, a first affinity criteria and a second affinity criteria may be used to find users satisfying either criteria.

The system may use an automated process to identify an interest category, e.g., by surveying all interests in the database storage system. Likewise, the system may use an automated process to identify a personal attribute classification, e.g., the system may identify the most common personal attributes associated with user identifiers having a particular interest or interest category. In some embodiments, the system iterates through predetermined sets of affinity criteria that may include interest categories paired with various personal attribute classifications.

The system may receive input, e.g., from an advertiser, identifying affinity criteria. For example, an advertiser may wish to identify a cohesive user group sharing a particular interest category related to a tailored content item. Likewise, an advertiser may wish to identify a cohesive user group fitting a demographic or other shared personal attribute classification.

In some implementations with an "explicit user input" option, the advertiser may be presented with a dialog box asking the advertiser to select one or more user interest categories and/or demographic characteristics. For an "algorithmic characterization" option, an example algorithm would be:

(1) analyze the terms or topics used in the text of the ad or offer description given by the advertiser user;
(2) collect statistics on similar ads, e.g., search ads that use similar terms or discuss similar topics and what is effective; and
(3) look at the users who click through on such search ads and look for broad interest categories and/or demographic characteristics shared by a large fraction of such users.

There are many more sophisticated techniques known in the trade for calculating such things as "what combination of user features best predict the likelihood a user will perform a given action", where in this case, "user features" are the broad categories of interests and demographics, and the action is "accepting the group offer". For example, for a coupon for an art dealer exhibition in New York City, the one or more computers may be programmed to select, in view of the activity of the coupon and its location, the collection for the art interest category and the collection for social groups in New York City. In some implementations, the advertiser may include in the advertiser campaign a request for one or more art categories and a location of New York City.

At step 520, the system accesses one or more databases of information for a social network, the information including a plurality of user identifiers, each user identifier associated with data for personal attributes, interests, and social network user connections. A social network user connection is a connection between two users of the social network. Examples of a social network include Facebook, Google+, LinkedIn, and Match.com. Participant users form profiles with a user identifier, personal attributes, interests, and social network user connections, e.g., friends, professional connections, and potential matches. A participant may be separated from another user by a number of intermediary users each having direct social network user connections. The connections form a graph such that a direct connection between two friends is a single edge, a friend of a friend forms a path with two edges (or two "hops"), and so forth. A friend of a friend may thus be a "two-hop" friend. Social network user connections that are not direct, or one-hop, connections are referred to as indirect connections.

At step 530, the system generates a first set of user identifiers by processing data obtained from the one or more databases such that first set is limited to user identifiers associated with characteristics that satisfy the identified affinity criteria. For example, the user identifiers are associated with one or more interests within an identified interest category and associated with one or more personal attributes within an identified personal attribute classification. For example, an advertiser may wish to deliver a tailored content item to racing enthusiasts between the ages of 15 and 40. The system 610 may generate a first set of user identifiers each associated with interests included in a "racing" interest category. For example, the interests in a "racing" interest category may include specific interests in car racing, motorcycle racing, Formula 1 racing, and NASCAR. The system 610 may also limit the first set of user identifiers to identifiers associated with an age attribute between 15 and 40. The advertiser may also wish to deliver the tailored content item to people located near a racing venue, so the system 610 may further limit the first set of user identifiers to user identifiers associated with one of a set of geographic locations. In some implementations, multiple sets of user identifiers are generated, For example, the system 610 may generate a first set of user identifiers associated with characteristics satisfying a first affinity criteria and a second set of user identifiers with characteristics satisfying a second affinity criteria.

At step 540, the system generates a graph representative of social network user connections between the user identifiers in the set of user identifiers. The graph is made up of nodes each representing a user identifier associated with characteristics that satisfy an affinity criteria, e.g., the set generated in step 530. Pairs of nodes are connected by edges, where each edge is either a direct-connection edge representing a direct social network user connection between the respective pair of nodes connected, or an indirect-connection edge representing an indirect social network user connection between the respective pair of nodes connected. An indirect social network user connection is, as previously described, a connection between two user identifiers where there is a path of direct connections through one or more intermediate user identifiers. The intermediate user identifiers are not necessarily in the first set of user identifiers or represented as nodes in the graph; they may be any intermediate user identifier through which there is an indirect social network user connection path. In some implementations, indirect social network user connections include posited connections representing an inferred connection between two users based on available data. For example, the information associated with two user identifiers may suggest that the two users have an acquaintance external to the social network; the posited acquaintance may be represented as an indirect social network user connection. In some implementations, a score is assigned to the posited indirect social network user connection representing a confidence in the connection or a likelihood that the users are, in fact, acquainted. A posited connection may be premised on a similarity of characteristics, geography, number of connections in common, institutional affiliations, and the like. In some implementations, a posited connection represents a potential relationship between two users, even where none exists, e.g., in a matching making system.

As previously described, the edges in the graph may be assigned weights, e.g., weights calculated as a function of one or more of a similarity of one or more interest characteristics for the pair of user identifiers represented by the nodes connected by the respective edge, a similarity of one or more personal attribute characteristics for each user identifier of the pair of user identifiers represented by the nodes connected by the respective edge, a number of social network users identifiers having a direct connection to each user identifier of the pair of user identifiers represented by the nodes connected by the respective edge, a number of hops separating the pair of user identifiers represented by the nodes connected by the respective edge, and a metric for messages communicated between the pair of user identifiers represented by the nodes connected by the respective edge. A metric for messages communicated between a pair of users may be one of a count of messages communicated between the pair of users over a fixed period of time, an average frequency of messages communicated between the pair of users, or a ratio of messages communicated between the pair of users compared with a total number of messages communicated by the pair of users over a period of time. In some implementations, data representing the nodes and/or edges of the graph is stored on computer readable media for later use.

In some implementations, step 540 and step 530 may be performed in opposite order. That is, in some implementations, the system identifies cohesive user groups based on the social network user connections and then selects users identifiers from the cohesive user group based on the identified interest category and/or personal attribute classifications. In some implementations, the first set is thus constructed to include users identifiers sharing direct social network user connections or indirect social network user connections with at most N intermediary users (where N could be 2, 3, or any other number of intermediate user identifiers). Thus the indirect social network user connections may be limited to at most N+1 hops.

At step 550, the system generates a sub-graph of the graph generated in step 540. The system generates the sub-graph such that each edge of the sub-graph satisfies selected edge criteria. For example, the selected edge criteria may be based on the edge weights described above, e.g., requiring nodes to be connected by edges having a weight below a threshold, above a threshold, or within a range. For example, the system may limit the result set to user identifiers having at least a certain number of friends in common. That is, based on how many social network user identifiers have direct connections to both user identifiers in a pair of user identifiers. The edge criteria may be that an indirect-connection edge must be within a select number of hops, e.g., at most two-hops or at most three-hops. In some implementations, the sub-graph is a connected graph. A connected graph is one in which a path exists between any one node in the graph and every other node in the graph. In some implementations, the sub-graph is a core graph where every node has at least k edges connecting to it.

At step 560, the system returns or stores data representing the nodes and edges of the resulting sub-graph on computer readable media. The sub-graphs may be generated by an automated process. Each sub-graph may be generated according to a schedule, e.g., the sub-graphs may be generated nightly, weekly, monthly, or quarterly. The pre-processed sub-graphs for each affinity criteria can then be made available to an advertiser. The system may receive a request for information and return information about the sub-graph, responsive to the request. In some implementations, the sub-graph is generated prior to receiving the request. That is, the sub-graph may be generated offline.

The advertiser may view aggregated information about each set and select sets for delivery of tailored content items. In some implementations, the information provided may comprise simply a number of the social groups and their attributes, e.g., social groups with an interest in art, and their size. In some implementations, such information may be provided in response to an online query by an advertiser for an art exhibition campaign, or it may be emailed or otherwise transmitted to the advertiser. In some implementations, the one or more computer systems may transmit or provide access to public information about specific users belonging to a grouping or group intersection, such as URLs of the respective user's public social network profile. Care is always taken to respect user privacy. In some implementations, information provided may be aggregated or provided as statistical estimates about the availability of the small tightly-interconnected groups of people all of whom lie within all of the first collections determined, by an algorithm, to be relevant to the activity and/or were selected by the user, or to such groups themselves. In this respect, the term "tightly-interconnected" is defined by applying any one of a number of mathematical measures of graph robustness, including, but not limited to, cliques, k-cores, dense sub-graphs, and social connection strengths as gathered from the one or more databases.

There are a number of potentially relevant measures of "graph robustness", including but not limited to, "cliques, k-cores, dense sub-graphs". In some implementations, this may comprise "measuring, approximating, or statistically estimating" values of such metrics, aggregated over all users. For example, in some implementations, a system may be programmed to answer queries like "Approximately how many 3-cores of 10 or more people are available among a set of all photography-interested users of age below 40?", or "about how many cliques of 4 people are interested in art and live in New York?" (a "clique" is a term of art for a group of people among which each pair is connected—which, in some implementations, may comprise every pair of users having at least one friend in common). In some implementations, there may be mathematically exact answers to these questions, but such a system will typically return approximate or statistically estimated answers rather than exact answers, due to the computational difficulty of computing exactly correct answers quickly. Note as used herein, an "approximate" answer is an answer that is guaranteed to be within some factor of the correct answer (e.g., if the system says "about 200 groups", it might mean that the exact number is definitely at least 150, if the approximation ratio guarantee is 4/3). On the other hand, a "statistical estimate" means that some random sampling was used to guess at the correct answer, and the answer obtained is roughly the same as the correct answer, but has some probability P of being somewhat off.

In some implementations, two or more of the collections may be intersected, using the one or more computers, to obtain an intersection collection of the user identifiers that are members of the two or more collections. For example, collections for one or more personal attributes such as gender, age range, and location data, income, to name a few, or other category collections may be used. For example, a collection of user identifiers in the art category and a collection of user identifiers that are over 40 years old, and a collection of user identifiers located in New York City, may be intersected to obtain an intersection collection. This intersection collection may then be used to select, using the one or more computers, user identifiers in the intersection collection to form one or more second groups of user identifiers that are socially cohesive, by accessing the friend attributes data in the one or more databases. In some implementations, the selecting of user identifiers for the intersection collection may be so that two user identifiers with a friend designation therebetween in the one or more databases are included in the respective second group only if they are friends or have at least one other friend designation in common. Information about the second groups, e.g., the size of the second group, formed from this intersection collection may then be provided using the one or more computers, or access to contact information may be provided to the one or more second groups.

In some implementations, a value may be assigned to the first groups and/or the second groups or the intersection groups to represent a level of social cohesion. For example, in some implementations, using the one or more computers, each pair of user identifiers that are friends in the group may be assigned an edge representing the friend designation between the two user identifiers of the pair of friends, and a weight may be generated for the edge based on one or more criteria. For example, a weight be determined, using the one or more computers, based at least in part on one or more criteria selected from the group of how many friends the respective user identifiers have in common, how many personal attributes the respective user identifiers have in common, and how many messages are exchanged between the respective user identifiers over a period of time, to name a few. Then a value may be computed, using the one or more computers, indicative of a social cohesion of the respective group based at least in part on the weights of the edges between user identifiers in the respective group. For example, the weights of the different edges between user identifiers in the respective group may be aggregated to obtain a total, or may be averaged, or another mathematical operation may be computed using these weights to obtain a value for the respective group. Then this weight value information may be provided, using the one or more computers.

In some implementations, at least a portion of the interest attributes data for the user identifiers in the one or more databases may be obtained, using the one or more computers. The interest attributes data may be obtained based, at least in part, on an online profile of the corresponding user identifier. The interest attributes data may be obtained based, at least in part, on user-contributed profile information. The interest attributes data may be obtained based, at least in part, on the user identifier's previous interactions with the social network, e.g., social activity updates, photos, online shopping, or online search queries, to name a few. The interest attributes data may be obtained based, at least in part, on some combination thereof.

In some implementations, a graph analysis computation may be performed by the one or more computers, the computation comprising constructing a graph G of the social network having a plurality of nodes and first edges connecting the nodes, wherein the nodes represent user identifiers, and wherein the first edges represent a friend designation between the user identifiers. In embodiments, a graph $G^2$ may then be calculated, using the one or more computers, from graph G, with the graph $G^2$ having a second edge indicative of a pseudo-relationship between two user identifiers having at least one friend in common. In some implementations, an operation may be performed of generating, using the one or more computers, a weight for the respective second edges in $G^2$ between user identifiers u and v determined, e.g., by a number of common friends w of both u and v.

In some implementations, further graph analysis computations may be performed of pruning/filtering, using the one or more computers, user identifiers from $G^2$ based on one or more criteria selected from the group of an age range limitation between user identifiers, gender, and location. When pruning/filtering is performed offline, it may, in some implementations, be performed as part of the previously described determination of cohesive social groups. In some implementations, this avoids the need to record a full list of possible "pseudo-relationships," and allows for recording only a filtered-down list of "pseudo-relationships." In some contexts, this can result in a boost to performance.

In some implementations, a further graph analysis computation may be performed of selecting, using the one or more computers, respective of the first groups for providing information or access by applying at least one of a densest subgraph algorithm or a k-core algorithm to the $G^2$ to obtain only third groups with at least k user identifiers.

Figure 6:
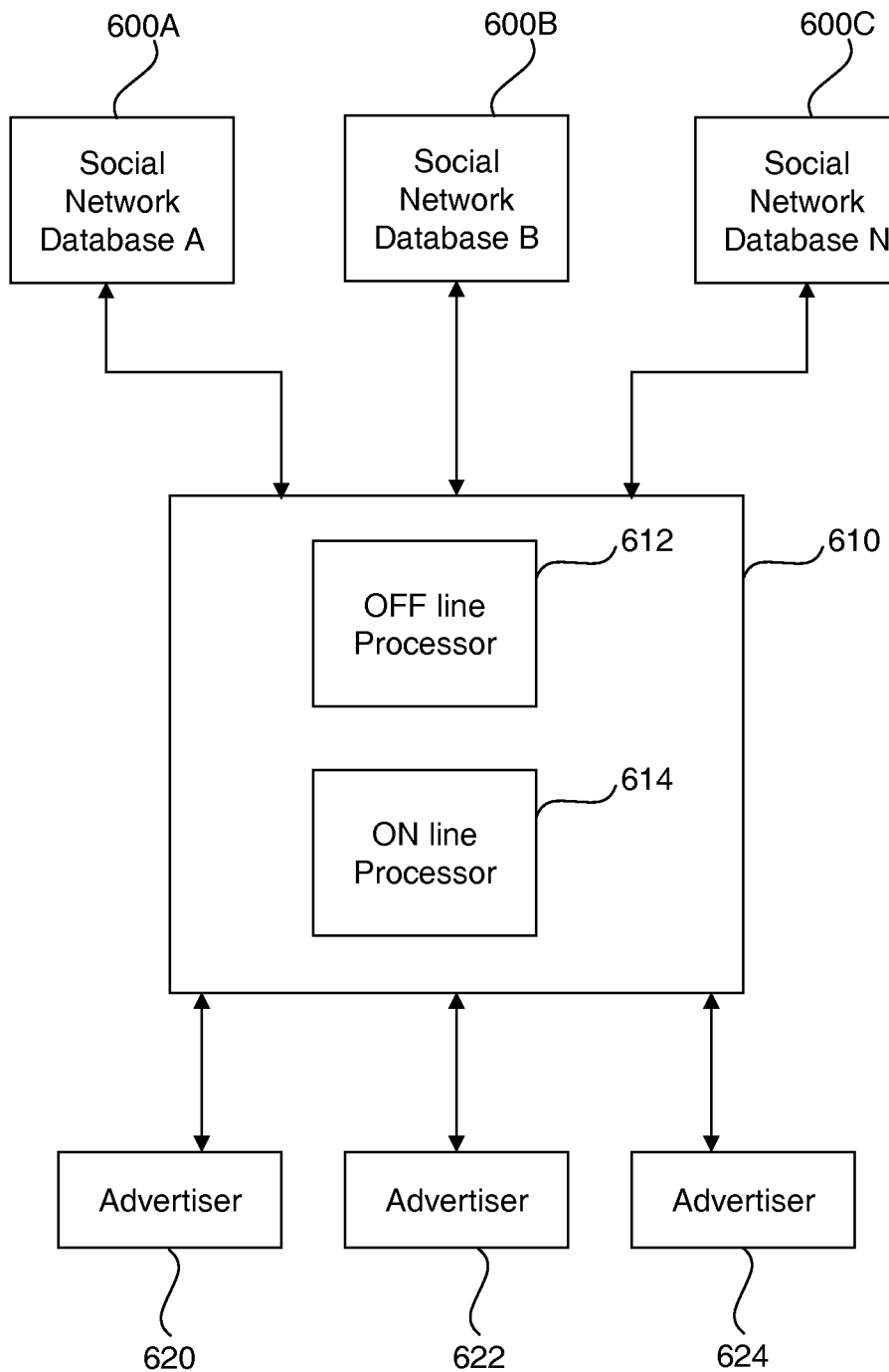
FIG. 6 is a diagram of a system configuration that may be used for implementations.

FIG. 6 illustrates an example system configuration that may be used in implementations. Block 600A represents social network database A. Block 600B represents social network database B. Block 600C represents social network database C.

In some implementations, a method and system may further comprise the steps of transmitting a group coupon to every user identifier in the intersection group, using one or more networks and the one or more computers; and validating or facilitating validation of the group coupon only if information is received indicating that a predetermined number of the user identifiers in the intersection group have accepted the offer.

Block 610 comprises one or more computers configured to perform the at least two stage processing consistent with the invention. Block 610 comprises an offline processor 612 configured for processing by filtering the data in the social networks associated with the user identifiers by interests, as previously discussed, and personal attributes to form the collections from within various of the social networks, and to perform $G^2$ processing to obtain sub-graphs of $G^2$ using the friend designations associated with the user identifiers. Block 610 further comprises an online processor 614 for determining an intersection of the various $G^2$ sub-graphs with the advertising parameters for an advertising campaign.

Connections are illustrated in FIG. 6 from the one or more computers 610 to the systems for advertiser 620, advertiser 622, and advertiser 624.

Figure 4:
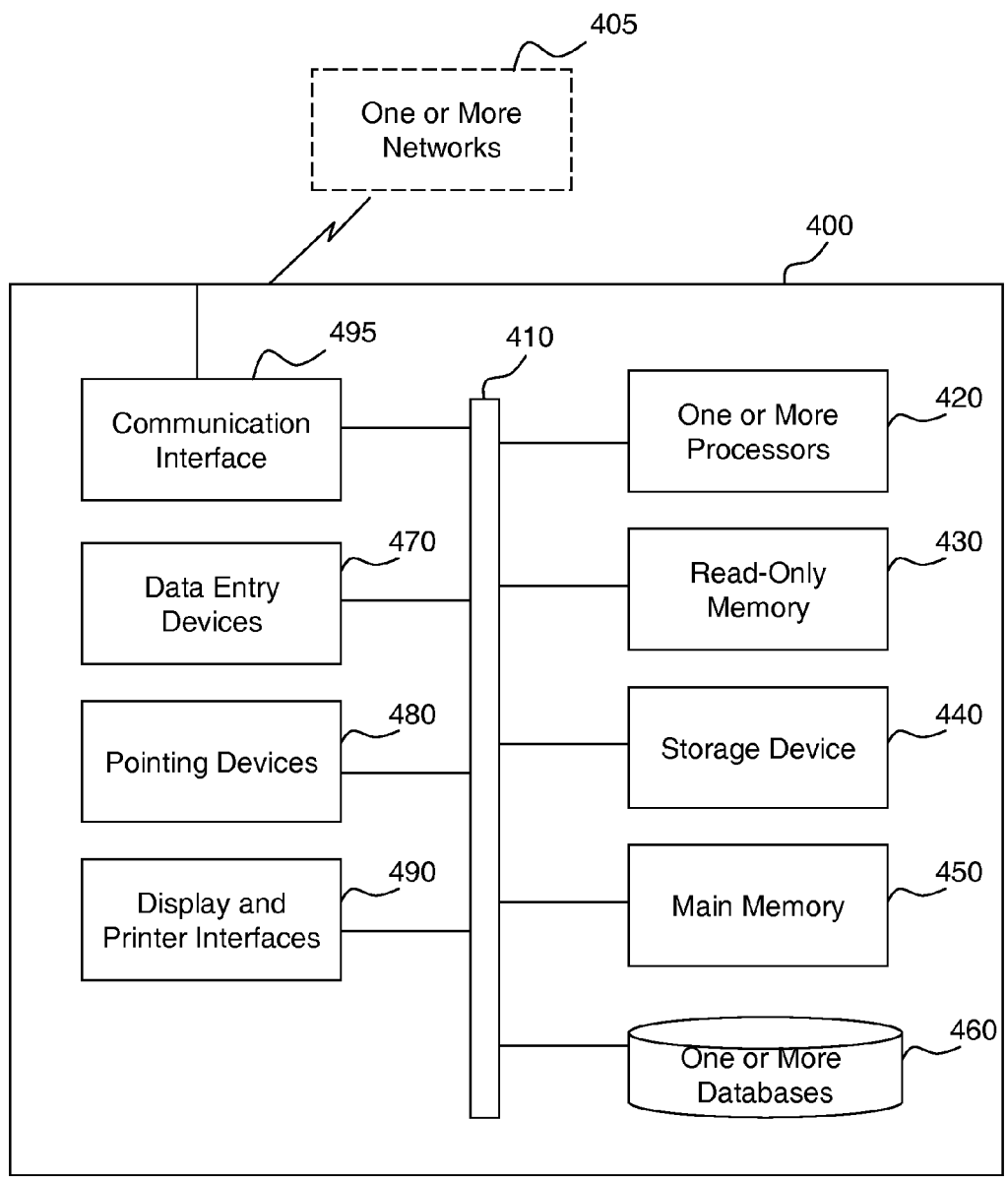
FIG. 4 is a diagram of a computer configuration that may be used for implementations.

FIG. 4 is a block diagram illustrating an implementation of a computer system that may be used for implementations, generally designated by reference number 400 in FIG. 4. In one implementation, the system 400 may be communicatively coupled to one or more networks 405 via a communication interface 495. The one or more networks 405 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface 495 may be implemented accordingly. The network 405 serves the purpose of delivering information between connected parties.

In some implementations, the Internet may comprise the network 405. The system 400 may also or alternatively be communicatively coupled to a network 405 comprising a closed network (e.g., an intranet). The system 400 may be configured to communicate, via the one or more networks 405, with respective computer systems of multiple entities.

The system 400 may comprise, in some implementations, a computing platform for performing, controlling, and/or initiating computer-implemented operations, for example, via a server and the one or more networks 405. The computing platform may comprise system computers and other party computers. The system 400 may operate under the control of computer-executable instructions to carry out the process steps described herein. Computer-executable instructions comprise, for example, instructions and data which cause a general or special purpose computer system or processing device to perform a certain function or group of functions. Computer software for the system 400 may comprise, in some implementations, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The system 400 may comprise one or more personal computers, workstations, notebook computers, servers, mobile computing devices, handheld devices, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few.

The system 400 may comprise, in some implementations, a bus 410 or other communication component that couples the various system elements 420-495, and is configured to communicate information between the various system elements 420-495.

As shown in FIG. 4, one or more computer processors 420 may be coupled with the bus 410 and configured to process and handle information and execute instructions. The system 400 may include a main memory 450, such as a Random Access Memory (RAM) or other dynamic storage device, coupled to the bus 400, for storing information and instructions to be executed by the one or more processors 420. The main memory 450 also may be used for storing temporary variables or other intermediate information during execution of instructions by the one or more processors 420.

The system 400 further may include a Read-Only Memory (ROM) 430 or other static storage device (e.g., EPROM, EAROM, EEPROM, PROM, flash, and the like) coupled to the bus 410 for storing static information and instructions for the one or more processors 420. Furthermore, a storage device 440, such as a magnetic disk or optical disk, such as a CD-ROM or other optical media may be provided and coupled to the bus 410 for storing information and instructions.

In addition to the ROM 430, one or more databases 460 may be coupled to the bus 410 for storing static information and software instructions. In some implementations, information stored in or maintained in the database 460 may be provided in conformance with a database system format such as, but not limited to, the Structured Query Language (SQL) format. Database query and access instructions, for example, in the form of one or more scripts, may be used which, when executed by a processor such as the processor 420, serve to access, store and retrieve data maintained in the database 460 according to the instructions contained in the script.

Furthermore, the system 400 may comprise application software instructions which may implement a user interface portion for generating interactive pages or display screens by which a user may provide data to and receive information from the system 400 and the database 460 using a human-machine interface. Interactive pages may include user dialog boxes for accepting user entered information. In particular, the human-machine interface may comprise a Graphical User Interface (GUI) portion for prompting the user to enter data by providing an interactive dialog box or message box instructing the user to enter particular data, or to select from among a multitude of options provided using a pull-down menu. A user may interact with the system 400 via the graphical user interface by using a pointing device and/or data entry device. The GUI portion may place the output of the system 400 in a format for presentation to a user via the display. In at least one implementation, the GUI may be implemented as a sequence of Java instructions.

A data entry device 470, including alphanumeric and other keys, or a pointing device such as a mouse or trackball, or a scanner, to name a few, may be coupled to the bus 410 for communicating information and command selections to the processor 420. The data entry device 470 may be coupled to the bus 410 via an interface (not shown), wherein the interface may be, for example, a serial port, an RS-232 port, or the like. In addition, the interface may be a wireless interface and provide connection-less communication via, for example, Bluetooth communication.

The system 400 may be coupled via the bus 410 to a display or printer 490 for outputting information to a computer user. In addition, a user may use the display (e.g., touch screen) or printer (e.g., scanner) to provide information to the system 400.

In some implementations, the various program operations as described herein may be provided by the system 400 in response to the one or more processors 420 executing one or more sequences of computer-readable instructions contained in the main memory 450. Such instructions may be read into the main memory 450 from another computer-readable medium, such as the ROM 430, the storage device 440, or the database 460. Execution of the sequences of instructions contained in the main memory 450 may cause the one or more processors 420 to perform the process steps described herein. It should be appreciated that implementations of the system 400 may perform fewer or additional processes as compared to those described herein. As noted, the one or more processors 420 may be arranged in a multi-processing arrangement. Alternatively, hard-wired circuitry may be used in place of or in combination with software instructions to implement the invention. Thus, implementations of the invention are not limited to any specific combination of hardware circuitry and software.

As previously noted, the system 400 also comprises a communication interface 495 coupled to the bus 410 for providing one-way, two-way or multi-way data communication with the network 405, or directly with other devices. In some implementations, the communication interface 495 may comprise a modem, a transceiver Integrated Services Digital Network (ISDN) card, a WAN card, an Ethernet interface, or the like, to provide a data communication connection to a corresponding type of communication medium. As another example, the communication interface 495 may comprise a LAN card to provide a data communication connection to a compatible LAN. Wireless links may also be implemented. In such wireless links, communication interface 495 may communicate with a base station communicatively coupled to a network server. In any such implementation, the communication interface 495 sends and receives electrical, electromagnetic, radio, infrared, laser, or optical signals that carry digital data streams representing various types of information. Any combination of the above interfaces may also be implemented.

In some implementations, the communication interface 495 may be communicatively coupled to a web server configured to generate and output web content that is suitable for display using a web browser at a computing device. In some implementations, the server may generate and transmit requested information through the communication interface 495 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from the clients' terminals, access and process data from various sources, and output computer-executable instructions and data using the network 405.

The web server, in some implementations, may correspond to a secure web application server operating behind a web server program that a service provider employs to run one or more web based application programs to carry out the methods described above in a secure fashion. Such a secure web application server may be configured to execute one or more web based application programs, respond to commands and data received from the clients (via a web page supported by the web server), and provide data and results to the clients. The web server and the web application server may be implemented using a single computing platform. Alternatively, it may be implemented using multiple separate and distributed computing platforms.

Implementations include program products comprising machine-readable media with machine-executable instructions or data structures stored thereon. Such machine-readable media may be any available storage media which can be accessed by a general purpose or special purpose computer or other machine with a processor. By way of example, such machine-readable storage media can comprise RAM, ROM, EPROM, EEPROM, CD-ROM or other optical disk storage, magnetic disk storage or other magnetic storage devices, or any other storage medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Implementations of the invention have been described in the general context of method steps which may be implemented by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Implementations of the present invention may be practiced with one or multiple computers in a networked environment using logical connections to one or more remote computers (including mobile devices) having processors. Logical connections may include the previously noted local area network (LAN) and a wide area network (WAN) that are presented here by way of example and not limitation. Implementations of the invention may also be practiced in distributed computing environments where tasks are performed by local and remote processing devices that are linked (either by hard-wired links, wireless links, or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the."

All components, modes of communication, and/or processes described heretofore are interchangeable and combinable with similar components, modes of communication, and/or processes disclosed elsewhere in the specification, unless an express indication is made to the contrary. It is intended that any structure or step of an implementation disclosed herein may be combined with other structure and or method implementations to form further implementations with this added element or step.

While this invention has been described in conjunction with the exemplary implementations outlined above, it is evident that many alternatives, modifications and variations will be apparent to those skilled in the art. Accordingly, the exemplary implementations of the invention, as set forth above, are intended to be illustrative, not limiting. Various changes may be made without departing from the spirit and scope of the invention.

What is claimed is:

1. A computer implemented method of identifying a cohesive user group in a social network for delivery of a tailored content item, the method comprising:

identifying first affinity criteria comprising at least one of a first interest category and a first personal attribute classification;

accessing one or more databases of information for a social network, the information comprising a plurality of user identifiers, each user identifier associated with data for personal attribute and interest characteristics and social network user connections;

generating, using one or more computer processors, a first set of user identifiers, by processing data obtained from the one or more databases such that the first set is limited to user identifiers associated with characteristics that satisfy the first affinity criteria;

generating a graph representative of social network user connections comprising a plurality of nodes and a plurality of edges, wherein each node represents a user identifier from the first set of user identifiers and each edge connects a pair of nodes and is one of a direct-connection edge representing a direct social network user connection between each user identifier represented by the respective pair of nodes connected by the edge and an indirect-connection edge representing an indirect social network user connection between each user identifier represented by the respective pair of nodes connected by the edge;

generating, using the one or more computer processors, a sub-graph of the graph, wherein each edge of the sub-graph satisfies selected edge criteria; and storing, on computer readable media, data representing the edges of the sub-graph.

2. The method of claim 1, further comprising assigning a weight to each edge in the graph, wherein the edge criteria comprises at least a weight threshold.

3. The method of claim 2, wherein the weight for each respective edge is a function of one or more of:

a similarity of one or more interest characteristics for each user identifier of the pair of user identifiers represented by the nodes connected by the respective edge, a similarity of one or more personal attribute characteristics for each user identifier of the pair of user identifiers represented by the nodes connected by the respective edge, a number of social network users identifiers having a direct connection to each user identifier of the pair of user identifiers represented by the nodes connected by the respective edge, a number of hops in the social network separating each user identifier of the pair of user identifiers represented by the nodes connected by the respective edge, and a metric for messages communicated between each user identified by the pair of user identifiers represented by the nodes connected by the respective edge.

4. The method of claim 3, wherein the message metric is one of a count of messages communicated between each user identified by the pair of user identifiers over a fixed period of time, an average frequency of messages communicated between each user identified by the pair of user identifiers, and a ratio of messages communicated between each user identified by the pair of user identifiers compared with a total number of messages communicated by the respective users over a period of time.

5. The method of claim 1, wherein the edge criteria comprises at least a maximum number of hops in a social network separating each user identifier of the pair of user identifiers represented by the nodes connected by a respective edge.

6. The method of claim 1, further comprising:
receiving a request for information; and
returning information about the sub-graph, responsive to the request;
wherein the sub-graph is generated prior to receiving the request.

7. The method of claim 1, wherein the sub-graph is a connected graph.

8. The method of claim 1, wherein an interest category comprises a plurality of interest characteristics and a personal attribute classification comprises a plurality of personal attribute characteristics.

9. The method of claim 1, wherein a personal attribute classification comprises one or more of a gender, an age range, an education level, a relationship status, a professional status, and a geographic location.

10. The method of claim 1, wherein a social network user connection is one of a friend connection, professional network connection, and match making connection.

11. A system for identifying a cohesive user group in a social network for delivery of a tailored content item, the system comprising:

one or more computer processors configured to access one or more databases storing information for a social network, the information comprising a plurality of user identifiers, each user identifier associated with data for personal attribute and interest characteristics and social network user connections;

wherein the one or more computer processors are further configured to:

identify first affinity criteria comprising at least one of a first interest category and a first personal attribute classification;

generate a first set of user identifiers, by processing data obtained from the one or more databases such that the first set is limited to user identifiers associated with characteristics that satisfy the first affinity criteria;

generate a graph representative of social network user connections comprising a plurality of nodes and a plurality of edges, wherein
each node represents a user identifier from the first set of user identifiers and
each edge connects a pair of nodes and is one of
a direct-connection edge representing a direct social network user connection between each user identifier represented by the respective pair of nodes connected by the edge and
an indirect-connection edge representing an indirect social network user connection between each user identifier represented by the respective pair of nodes connected by the edge;

generate a sub-graph of the graph, wherein each edge of the sub-graph satisfies selected edge criteria; and store, on computer readable media, data representing the edges of the sub-graph.

12. The system of claim 11, wherein the one or more computer processors are further configured to assign a weight to each edge in the graph, wherein the edge criteria comprises at least a weight threshold.

13. The system of claim 12, wherein the weight for each respective edge is a function of one or more of:

a similarity of one or more interest characteristics for each user identifier of the pair of user identifiers represented by the nodes connected by the respective edge, a similarity of one or more personal attribute characteristics for each user identifier of the pair of user identifiers represented by the nodes connected by the respective edge, a number of social network users identifiers having a direct connection to each user identifier of the pair of user identifiers represented by the nodes connected by the respective edge, a number of hops in the social network separating each user identifier of the pair of user identifiers represented by the nodes connected by the respective edge, and a metric for messages communicated between each user identified by the pair of user identifiers represented by the nodes connected by the respective edge.

14. The system of claim 13, wherein the message metric is one of a count of messages communicated between each user identified by the pair of user identifiers over a fixed period of time, an average frequency of messages communicated between each user identified by the pair of user identifiers, and a ratio of messages communicated between each user identified by the pair of user identifiers compared with a total number of messages communicated by the respective users over a period of time.

15. The system of claim 11, wherein the edge criteria comprises at least a maximum number of hops in a social network separating each user identifier of the pair of user identifiers represented by the nodes connected by a respective edge.

16. The system of claim 11, wherein the one or more computer processors are further configured to:
   receive a request for information; and
   return information about the sub-graph, responsive to the request;
   wherein the sub-graph is generated prior to receiving the request.

17. The system of claim 11, wherein the sub-graph is a connected graph.

18. The system of claim 11, wherein an interest category comprises a plurality of interest characteristics and a personal attribute classification comprises a plurality of personal attribute characteristics.

19. The system of claim 11, wherein a personal attribute classification comprises one or more of a gender, an age range, an education level, a relationship status, a professional status, and a geographic location.

20. The system of claim 11, wherein a social network user connection is one of a friend connection, professional network connection, and match making connection.

* * * * *